United States Patent

[11] 3,623,079

[72] Inventor Ralph H. Schuman
Cleveland, Ohio
[21] Appl. No. 878,986
[22] Filed Dec. 8, 1969
[45] Patented Nov. 23, 1971
[73] Assignee The Warner & Swasey Company
Cleveland, Ohio
Continuation of application Ser. No. 560,951, June 6, 1966, now abandoned.

[54] PATTERN READING ANALOG-TO-DIGITAL CONVERTER
17 Claims, 18 Drawing Figs.

[52] U.S. Cl. .......... 340/347 P, 340/358
[51] Int. Cl. .......... G08c 9/06, G08c 9/08
[50] Field of Search .......... 340/347, 357, 358; 235/92

[56] References Cited
UNITED STATES PATENTS

| | | | |
|---|---|---|---|
| 3,188,626 | 6/1965 | Palmer | 340/347 |
| 3,218,626 | 11/1965 | Schuman | 340/347 |
| 3,268,885 | 8/1966 | Coyle et al. | 340/347 |
| 3,275,807 | 9/1966 | Harper | 235/92 |
| 3,286,251 | 11/1966 | Byun et al. | 340/347 |
| 3,371,335 | 2/1968 | Seewald | 340/347 |
| 3,484,780 | 12/1969 | Kamol et al. | 340/347 |

*Primary Examiner*—Maynard R. Wilbur
*Assistant Examiner*—Michael K. Wolensky
*Attorney*—Yount, Flynn and Tarolli

ABSTRACT: An improved code converter includes a coded information member and signal generators or readers which cooperate therewith to indicate the magnitude of a quantity with a multidigit number to the base 10. The coded information member and signal generators provide signals defining a cyclic code having 20 unique representations for defining a first multidigit binary number indicating the magnitude of a given order digit of the base 10 multidigit number. The magnitude of the binary digit $2^0$ of a second multidigit binary number for indicating the value of the next significant order digit of the base 10 multidigit number is derived from the signals defining the 20 unique representations for the given order digit. Lead and lag reading devices are advantageously controlled in dependency upon the magnitude of the binary digit $2^0$ of the multidigit binary number for indicating the value of the next significant order digit.

INVENTOR.
RALPH H. SCHUMAN
BY Hoffmann and Young
ATTORNEYS

INVENTOR.
RALPH H. SCHUMAN
BY Hoffmann and Yount
ATTORNEYS

PATENTED NOV 23 1971 3,623,079

SHEET 3 OF 6

INVENTOR.
RALPH H. SCHUMAN
BY Hoffmann and Young
ATTORNEYS

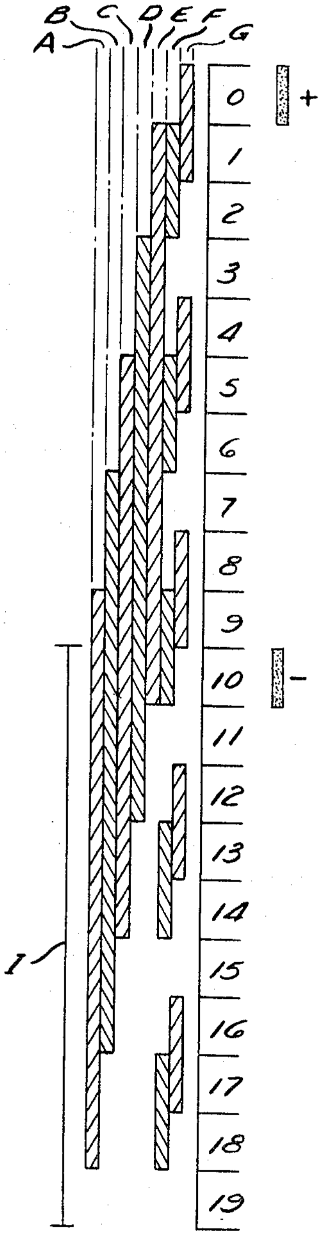
Fig. 5
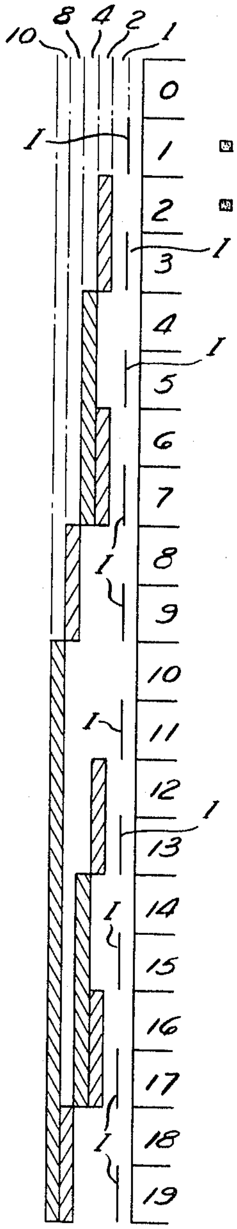
Fig. 7
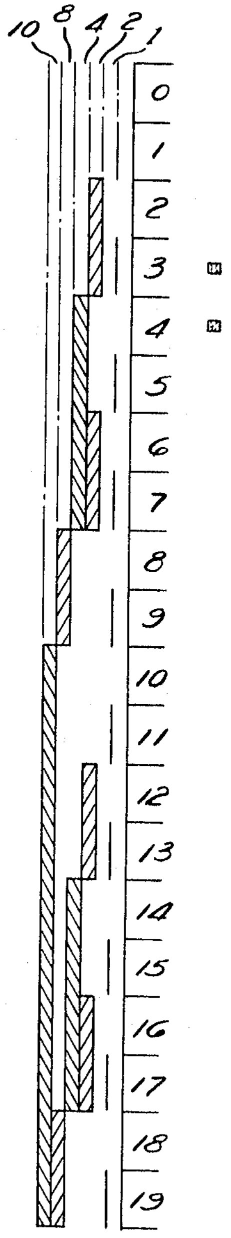
Fig. 8
$2^0 = 1 = FG + \bar{F}\bar{G}$
$2^1 = 2 = \bar{G}\bar{A}E + GA\bar{E}$
$2^2 = 4 = \bar{G}(\bar{A}C + B\bar{D}) + G(\bar{B}D + A\bar{C})$
$2^3 = 8 = \bar{G}\bar{B}\bar{E} + GBE$
$10 \times 2^0 = 10 = \bar{G}(A + \bar{E}) + A\bar{E}$
Fig. 6
INVENTOR.
RALPH H. SCHUMAN
BY Hoffmann and Yount
ATTORNEYS INVENTOR.
RALPH H. SCHUMAN
BY Hoffmann and Yount
ATTORNEYS

PATTERN READING ANALOG-TO-DIGITAL CONVERTER

This application is a continuation of application Ser. No. 560,951, filed June 6, 1966 and now abandoned.

This invention relates to an analog-to-digital converter for producing a decimal number representation of an analog quantity, particularly the rotational position of a rotary member.

In its overall aspect, the present invention is concerned with providing an analog-to-digital converter capable of providing a very precise decimal readout of the rotational position of a rotary member which may be rotating at a relatively high speed. This is achieved in the present invention by a novel arrangement which does not involve excessively stringent manufacturing tolerances.

In accordance with one aspect of the present invention, the finest decade of the decimal number is provided by reading certain zones of a binary-coded member, such as a code disc, in accordance with a novel code which provides a nonambiguous reading and which will accommodate misalignment and other manufacturing tolerances without an error in the reading.

In accordance with another aspect of this invention, successively coarser decades of the decimal number (after the finest decade) are provided by reading additional binary-coded zones by lead and lag reading devices, with increasing tolerances permissible for each successively coarser decade.

Preferably, the present converter includes two binary-coded code discs, the first one of which provides the finer decades of the decimal number and the unit binary digit for the next coarser decade, and the second of which provides the remaining binary digits of this next decade and also an additional coarser decade. The first disc is driven directly by the rotary member whose rotational position is to be measured, and reduction gearing is provided between the two code discs so that the second code disc rotates at a speed which is the proper fraction of the rotational speed of the first code disc. The reading tolerances for the second code disc are large enough that backlash in the reduction gearing will not produce an error in the decade readings provided by the second code disc.

Preferably, also, where used to measure the lineal position of a member, the two code discs are read by identical reading arrangements and are encoded to provide increasing decimal numbers for opposite respective rotational directions, the code discs being interchangeable with one another, without changing the reading arrangements, for different directions of positive rotation of the rotary input member.

In accordance with another aspect of the present invention, the coarsest decade of the decimal number is provided by switches operated by cams driven through reduction gearing from the second code disc. These cams operate respective lead and lag switches in accordance with a binary-coded decimal code. The permissible tolerances for this coarsest decade are large enough to permit the "reading" to be done by cam-operated switches and to accommodate the gear backlash without error in the reading of this decade.

It is a principal object of this invention to provide a novel and improved analog-to-digital converter of high precision.

Another object of this invention is to provide a novel and improved analog-to-digital converter for providing a decimal number reading of the analog quantity being measured, in which successively coarser decades have increasing permissible tolerances without causing error in the decimal number reading.

Another object of this invention is to provide a novel and improved analog-to-digital converter including a pair of binary-coded code discs which are read to provide successive decades of a decimal number reading, with the second code disc being driven through reduction gearing at a fraction of the rotational speed of the first code disc and with the permissible tolerances for reading the second code disc, without error in the decimal number readout, being large enough to accommodate backlash in the reduction gearing between the first and second discs.

Another object of this invention is to provide a novel and improved analog-to-digital converter including a rotatable high-speed code disc which is read to provide the finest decades of a decimal number reading and a low speed code disc which is rotated in the opposite direction at a decimal fraction of the speed of the high-speed disc and is read to provide coarser decades of the decimal number, the two code discs being interchangeable for opposite positive rotational directions of a rotary input member.

Another object of this invention is to provide an analog-to-digital converter having a binary-coded member and reading devices which are arranged to read the binary-coded member to provide the finest decade of a decimal number reading in accordance with a novel binary-coded decimal code.

Another object of this invention is to provide a novel and improved analog-to-digital converter in which the coarsest decade of a decimal number reading is provided by cam-operated switches.

Further objects and advantages of this invention will be apparent from the following detailed description of a presently preferred embodiment, which is shown in the accompanying drawings.

In the drawings:

FIG. 5 shows the novel binary-coded decimal code for the finest decade reading of the FIG. 3 code disc;

FIG. 6 shows the Boolean equations for the FIG. 5 code;

FIG. 7 shows the binary-coded decimal code for the next coarser decade reading of the code disc;

FIG. 8 shows the binary-coded decimal code for all subsequent coarser decades;

GENERAL DESCRIPTION

Figure 1:
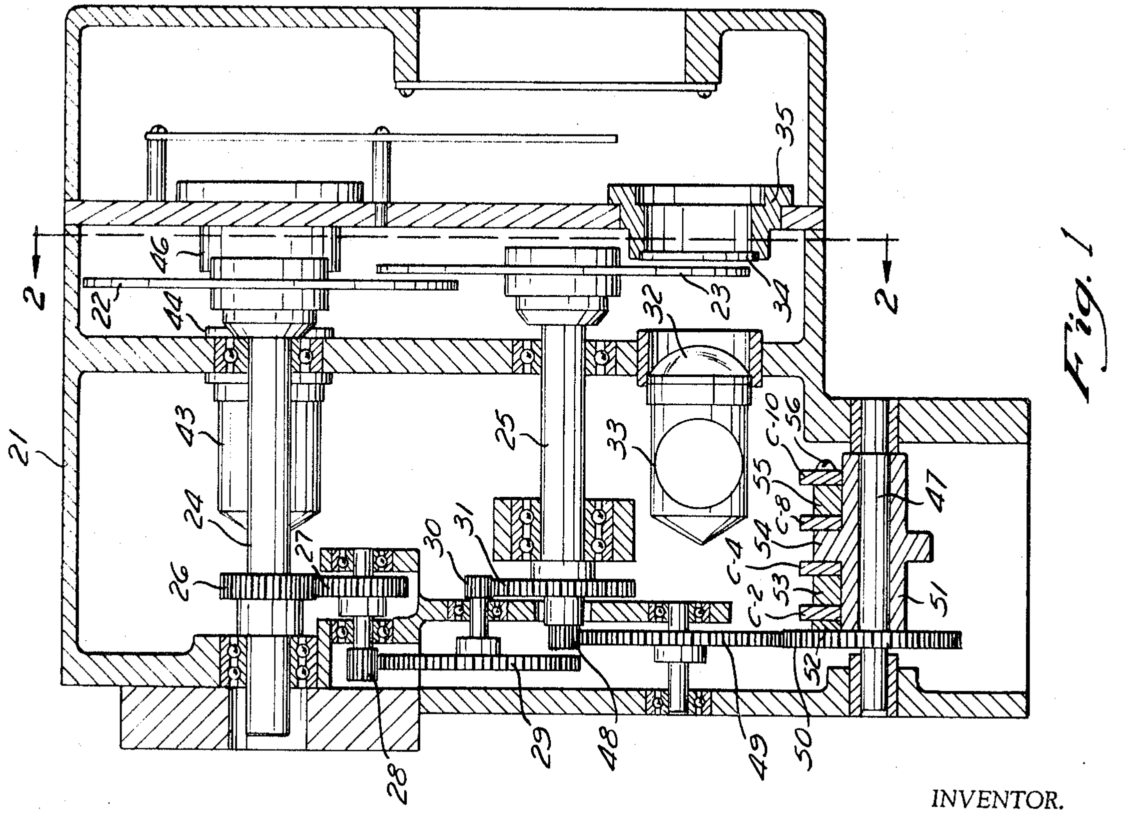
FIG. 1 is a longitudinal section through an analog-to-digital converter in accordance with the present invention.
Figure 3:
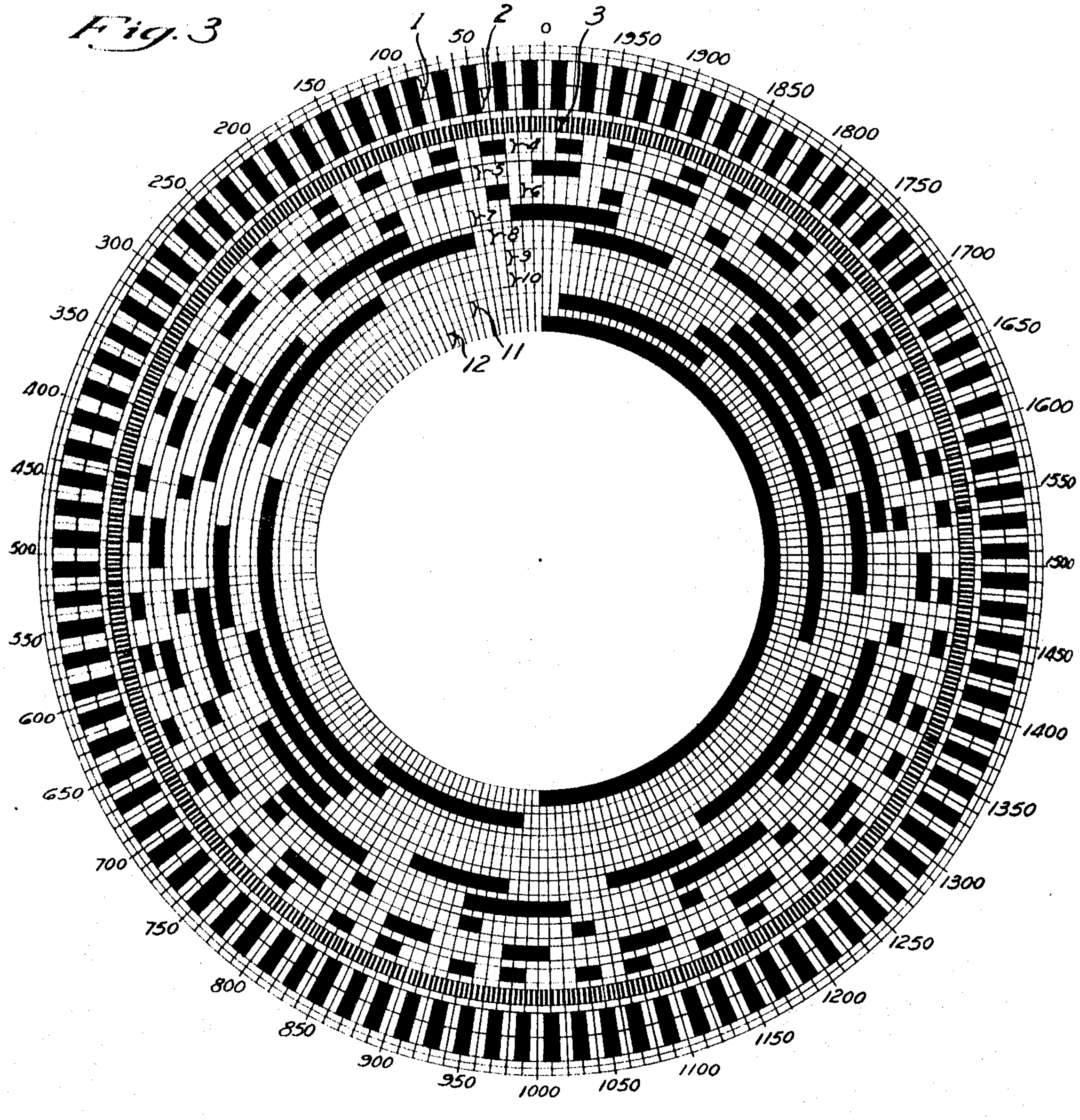
FIG. 3 shows one of the binary-coded code discs in the FIG. 1 converter, with the transparent and opaque areas being reversed to facilitate the illustration and description.

Referring first to FIG. 1, the present apparatus includes a housing 21 which encloses a pair of rotatable binary-coded code discs 22 and 23. The high-speed first code disc 22, shown in detail in FIG. 3, is attached to a rotatable input shaft 24, which is coupled outside the housing to a rotary member whose rotational position is to be determined, such as a lead screw in a machine tool.

Figure 9:
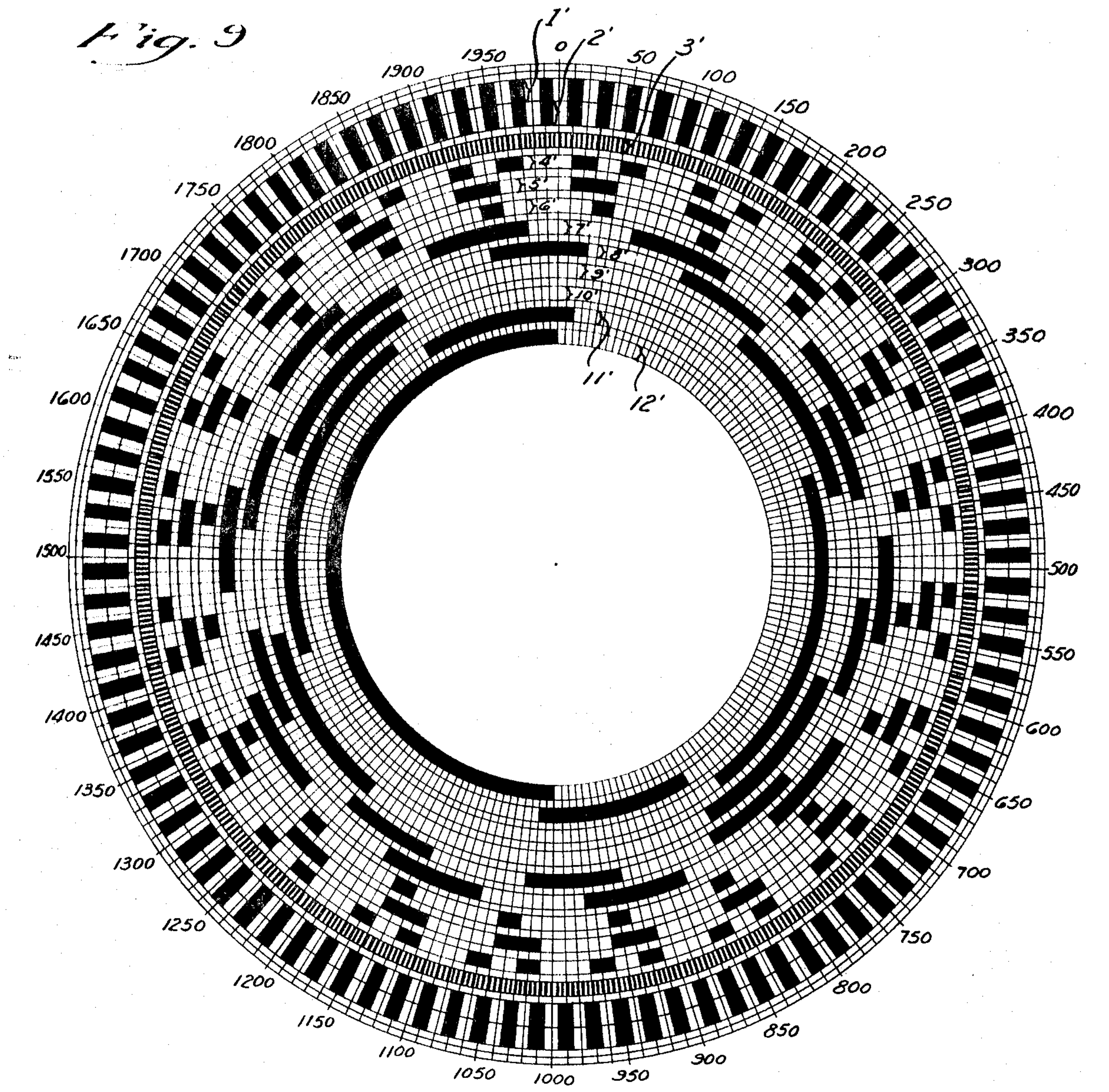
FIG. 9 shows the second code disc in the FIG. 1 converter.

The input shaft 24 drives a second shaft 25 with a 100 to 1 speed reduction and a reversal of the rotational direction through speed-reducing gears 26–31. The low speed second code disc 23, shown in detail in FIG. 9, is attached to this second shaft 25. As best seen in FIG. 1, a lens 32 is fixedly positioned at the left side of the second code disc 23 to shine light from a lamp 33 onto a predetermined area of this code disc. An opaque slitted mask 34 is fixedly positioned at the right side of the code disc 23, directly opposite the lens 32, to receive light passing through transparent areas on the code disc. This mask 34 has a plurality of slits positioned in front of respective photoelectric cells (not shown) which are fixedly supported by a photocell holder 35. With this arrangement, as explained in detail hereinafter, each photocell receives light in those rotational positions of the code disc 23 in which the code disc presents a transparent area directly in front of the mask slit for that photocell, and the photocell does not receive light in those rotational positions of the code disc in which is presents an opaque area directly in front of the respective mask slit.

Figure 2:
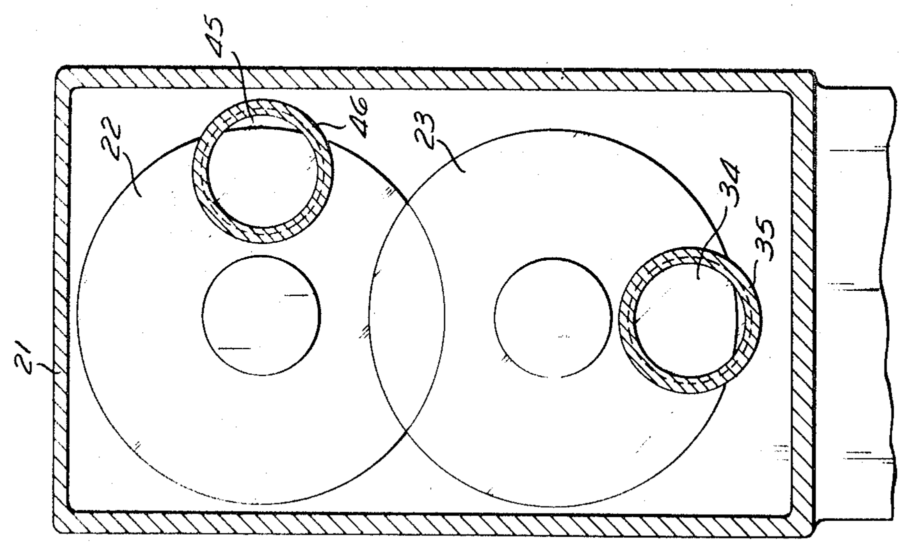
FIG. 2 is a cross section taken along the line 2—2 in FIG. 1.

A similar reading arrangement is provided for reading the rotational position of the first code disc 22, including a lamp 43 and a lens 44 at the left side of this disc in FIG. 1 and an opaque slitted mask 45 (FIG. 2) and a photocell holder 46 at the opposite side.

As explained hereinafter, the first code disc 22 has a plurality of circular zones in succession radially inward. Each of these zones presents alternate transparent and opaque areas in succession along its arcuate extent which are to be read by the photocells behind respective slits in mask 45. A group of the outermost zones on code disc 22 provides the finest decade readout which, in one practical embodiment, may be graduated to indicate ten-thousandths of an inch of lineal movement of the device driven by the lead screw. The next group of zones radially inward on code disc 22 provides the next finest decade readout (e.g., the 0.001 inch decade). A third innermost group of zones on code disc 22 provides the next decade (e.g., the 0.01 inch decade).

As already mentioned, there is a 100:1 speed reduction between shafts 24 and 25, so that the second code disc 23 will rotate at a speed one-hundredth that of the first code disc and in the opposite direction. That is, if the first code disc 22 presents increasing numbers as it rotates clockwise, the second code disc presents increasing numbers as it rotates counterclockwise, or vice versa.

The second code disc 23 also has a plurality of arcuate zones in succession radially inward, each zone presenting alternate transparent and opaque areas. These zones are arranged in three groups, similar to the described grouping of the zones on the first code disc 22, but the outermost group of zones on the second code disc 23 is not used. The reason for this is to avoid the necessity of providing a 1,000 to 1 gear reduction between the two code discs, which would introduce severe problems due to gear backlash. Instead, the middle group of zones on the second code disc 23 is used to provide the next coarser decade (e.g., the 0.1 inch decade), and the final group of zones radially inward on disc 23 is used to provide the next coarser decade after that (e.g., the 1.0 inch decade).

The two code discs 22 and 23 are interchangeable with one another. For example, when clockwise rotation of the lead screw produces increasing numbers, the "clockwise" disc is mounted on the first shaft 24 and the "counterclockwise" disc is on the second shaft 25. However, when increasing numbers are to be produced by counterclockwise rotation of the lead screw, then the "counterclockwise" code disc is attached to shaft 24 and the "clockwise" code disc is attached to shaft 25. In such event, all three groups of zones on the "counterclockwise" code disc will be read by the photocells behind mask 45, and only the tow inward groups of zones on the "-clockwise" code disc will be read by the photocells behind mask 34. To convert between "increasing clockwise" code "increasing counterclockwise" operation, the code discs 22 and 23 must be interchanged, but the light sources, lenses and masks remain as before. The two masks 34 and 45 are identical with each other, as are the photocell holders and the photocell assemblies thereon.

The final, coarsest decade readout (e.g., the 10 inch decade) is provided by a group of four cams, C–2, C–4, C–8 and C–10, carried by a rotatable shaft 47 and arranged to operate limit switches, as described in detail hereinafter with reference to FIGS. 10–13. Shaft 47 is driven from the second shaft 25 through gears 48, 49 and 50 which provide a 10 to 1 speed reduction from shaft 25 to shaft 47.

READING THE FIRST CODE DISC (THREE FINEST DECADES)

In FIGS. 3–8, for convenience of illustration and description, the convention is adopted that a dark area represents a positive signal (binary one), while a light area indicates the absence of a positive signal (binary zero). In actual practice, however, where the reading is done photoelectrically, a binary one signal will be produced when the code disc presents a transparent area to the corresponding photoelectric cell, and a binary zero will be produced when the code disc presents an opaque area. Therefore, in such a photoelectric unit the actual code disc will have opaque areas where the light areas appear in FIGS. 3 and 4, and transparent areas where the dark areas appear in FIGS. 3 and 4.

Figure 4:
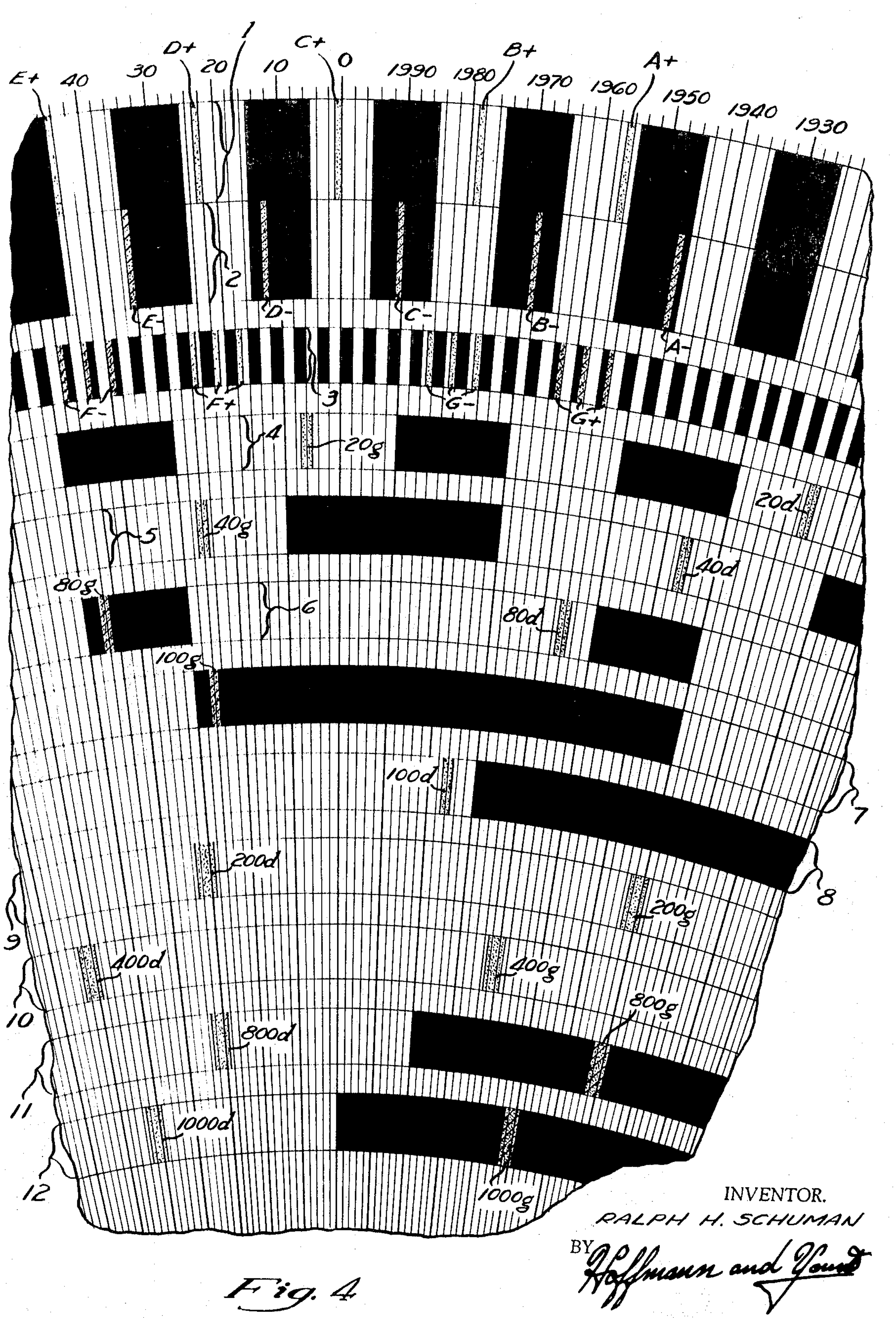
FIG. 4 is a view showing in enlarged detail the area of the FIG. 3 code disc which is being read by photocells behind a slitted opaque mask whose reading slits are shown stippled in FIG. 4 and superimposed over the code disc.

This is also true of the mask for the photoelectric cells. The mask will have transparent reading slits which are shown stippled in FIG. 4, and the rest of the mask will be opaque. In FIG. 4 the stippled reading slit is crosshatched if it is reading a binary one area of the code disc, and it is not crosshatched if it is reading a binary zero area of the code disc.

Referring to FIG. 3, the first code disc 22 is shown with a reference scale divided circumferentially into 2,000 equal parts and numbered accordingly, the numbers increasing counterclockwise. As shown in FIG. 1, the code disc 22 is mounted for rotation with respect to the nonrotatable slitted reading mask 45 an photoelectric cells fixedly positioned on the opposite side of the mask from the code disc. Clockwise rotation of the code disc produces increasing numbers of the code disc on the reference scale and therefore will be referred to as positive rotation.

The code disc carries 12 different circularly extending zones in succession radially and numbered 1 to 12 in FIG. 3, with the number 1 zone being the outermost zone on the disc, the number 2 zone being next inward radially, and so on. Zones 1–3 together provide the finest decade readout and unit readout (i.e., the binary digit weighted one) for next decade. Zones 4–8 provide the balance of the second finest decade readout and unit readout for next decade. Zones 9–12 provide the balance of the coarse decade readout on code disc 22 and the unit readout for a decade to be completed on the second code disc 23.

As shown in FIGS. 3 and 4, both zones 1 and 2 of code disc 22 provide a binary zero condition (here shown as a light area, but in reality opaque on the actual code disc) from reference scale number 1995 to 5, from 15 to 25, from 35 to 45, and so on at equally spaced intervals circumferentially. The remaining areas of zones 1 and 2 (e.g., from 5 to 15, from 25 to 35, etc.) present the binary "one" condition (here shown as dark, but in reality transparent in the actual code disc). Thus, both zones 1 and 2 provide alternate binary zero and binary one areas in succession circumferentially, each having a circumferential width of 10 numbered positions along the reference scale.

Zone 3 is the finest resolution zone on the code disc, providing alternate binary one and binary zero areas in succession, each having a circumferential width of two numbered positions along the reference scale. For example, there are binary one areas from 2 to 4, 6 to 8, 10 to 12, etc. along the reference scale, and binary zero areas from 0 to 2, 4 to 6, 8 to 10, etc., along the scale.

Zone 4 has binary one areas from 30 to 50, from 70 to 90, from 130 to 150, from 170 to 190, and so on in a repetitive sequence, and binary zero areas from 1990 to 30, from 50 to 70, from 90 to 130, from 150 to 170, etc.

Zone 5 has binary one areas from 70 to 110, from 170 to 210, from 270 to 310, and so on in a repetitive sequence, and binary zero areas from 10 to 70, from 110 to 170, from 210 to 270, etc.

Zone 6 has binary one areas from 30 to 50, from 130 to 150, from 230 to 250, and so on in a repetitive sequence, and binary zero areas from 1950 to 30, from 50 to 130, from 150 to 230, etc.

Zone 7 has binary one areas from 1930 to 30, from 130 to 230, from 330 to 430, and so on in a repetitive sequence, and binary zero areas from 30 to 130, from 230 to 330, etc.

Zone 8 has binary one areas from 70 to 170, from 270 to 370, and so on in a repetitive sequence, and binary zero areas from 1970 to 70, from 170 to 270, etc.

Zone 9 has binary one areas from 180 to 380, from 580 to 780, from 1180 to 1380, and from 1580 to 1780, and binary zero areas from 1780 to 180, from 380 to 580, from 780 to 1180, and from 1380 to 1580.

Zone 10 has binary one areas from 410 to 810, and from 1410 to 1810, and binary zero areas from 1810 to 410, and from 810 to 1410.

Zone 11 has binary one areas from 780 to 980, and from 1780 to 1980, and binary zero areas from 1980 to 780, and from 980 to 1780.

Zone 12 has a binary one area from 1000 to 0, and has a binary zero area from 0 to 1000.

FINEST DECADE READOUT

An important feature of the present invention resides in the novel readout arrangement for the finest decade, which will now be described in detail with reference to FIGS. 4 and 5.

Figures 15, 16, 17, 18:
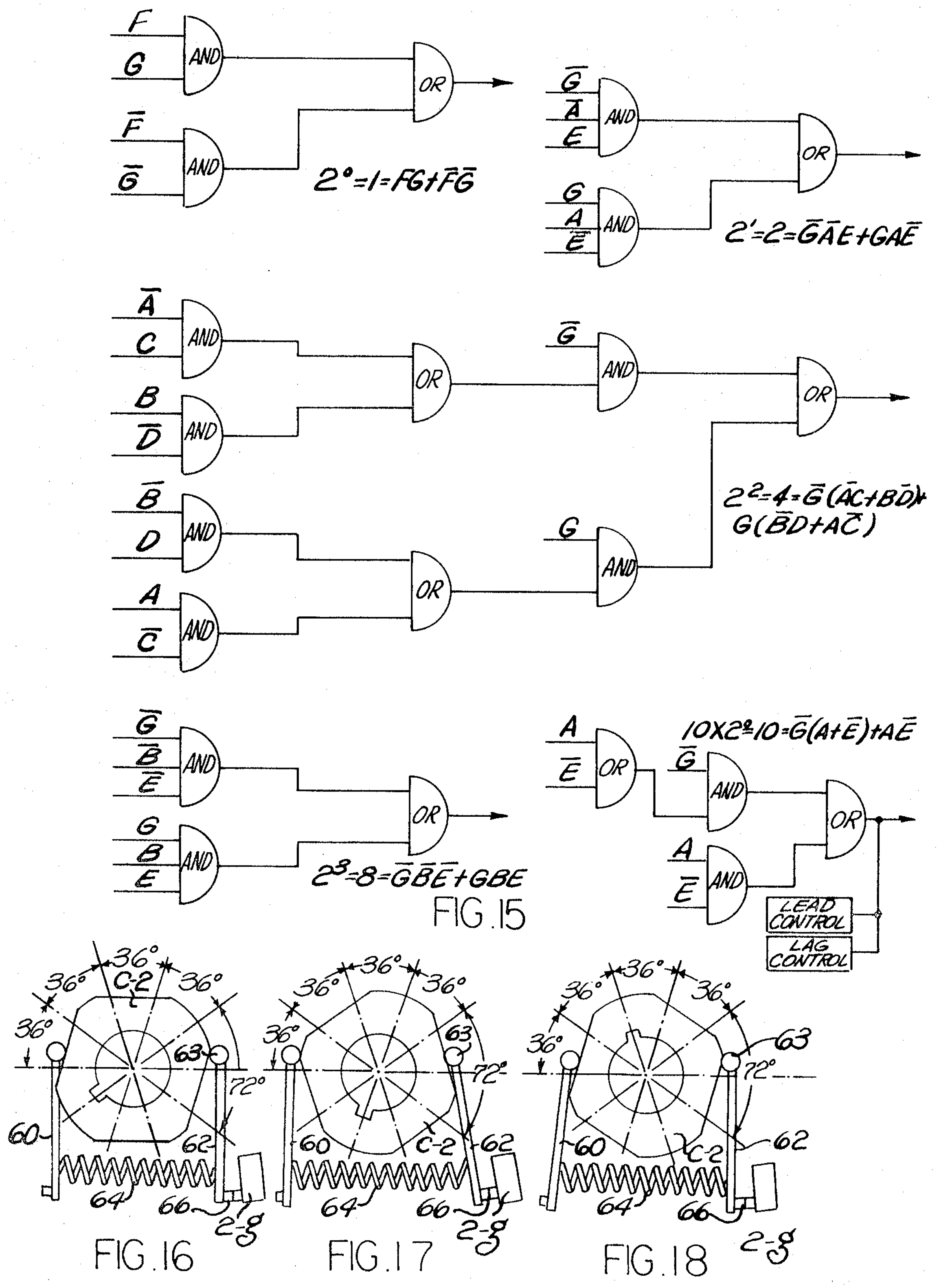
FIG. 15 is a schematic illustration of logic circuitry corresponding to the Boolean equations of FIG. 6.
FIGS. 16–18 illustrate various positions for the cam of FIG. 10.

FIG. 5 shows the novel code of the finest decade. FIG. 6 gives the Boolean equations for the binary digits weighted one, two, four, eight and 10 which provide the decimal numbers 0 through 19 in the FIG. 5 code. FIG. 15 illustrates logic circuitry corresponding to the Boolean equations of FIG. 6.

From these equations, the logic circuitry and from the code of FIG. 5 it will be seen that the decimal number N is odd when both F and G are binary zero or when both F and G are binary one. N is even when F and G are different. This is stated in the first equation in FIG. 6, where the binary digit weighted one is equal to F and G, or not F and not G.

The binary digit with weight two occurs for decimal numbers which end in 2, 3, 6 or 7. This occurs for decimal numbers 2, 3, 6, 7, 12, 13, 16, 17 in the FIG. 5 code. The binary digit weighted two for the decimal numbers 2, 3, 6 and 7 occurs when $E=1$, $A=0$ and $G=0$. The binary digit weighted two for the decimal numbers 12, 13, 16 and 17 occurs when $E=0$, $A=1$ and $G=1$. These conditions are stated in the second equation of FIG. 6.

The binary digit weighted four occurs for decimal numbers 4, 5, 6, 7 and 14, 15, 16 and 17 in the FIG. 5 code. The binary digit weighted four for decimal numbers 4 and 5 occurs when $D=1$, $B=0$, and $G=1$; for decimal numbers 6 and 7 when $C=1$, $A=0$, and $G=0$; for decimal numbers 14 and 15 when $D=0$, $B=1$ and $G=0$; and for decimal numbers 16 and 17 when $C=0$, $A=1$ and $G=1$. These conditions are all stated by the third equation of FIG. 6.

The binary digit weighted eight occurs for the decimal numbers 8, 9, 18 and 19 in the FIG. 5 code. The binary digit weighted eight for decimal numbers 8 and 9 occurs when $B=1$, $E=1$ and $G=1$; and for decimal numbers 18 and 19 when $B=0$, $E=0$ and $G=0$. These conditions are stated by the fourth equation of FIG. 6.

The binary digit with unit weight in the next coarser decade, or $10\times2^0$, is referred to as the binary digit weighted 10 grouped with the first decade. This occurs for all odd decades (e.g., the decade from 10 through 19) in FIG. 5. This binary digit weighted 10 occurs for decimal numbers 11 through 18 in the FIG. 5 code when $A=1$ and $E=0$; for 10, 11, 14, 15, and 18 when $G=0$ and $A=1$; and for 11, 14, 15, 18, and 19 when $G=0$ and $E=0$. These conditions are stated by the fifth equation of FIG. 6.

From the equations of FIG. 6 and the code of FIG. 5, it will be evident that the binary digit weighted one in the finest decade is determined by both $F$ and $G$. This occurs in all odd-numbered decimal positions of the code.

The binary digits weighted two, four, eight and 10 in the finest decade are all determined by changes in $G$.

For example, the binary digit weighted two in the even decimal decades (e.g., 0–9, or 20–29, etc.) are where $G=0$. These positions where $G=0$ are bracketed by $E$ changing from 0 to 1 at a low end and $A$ changing from 0 to 1 at the high end. It can be seen that $E$ does not have to be precisely defined and could change from 0 to 1 anywhere during the decimal number positions 0 and 1 in the FIG. 5 code, and $A$ could change from 0 to 1 anywhere during the decimal number positions 8 and 9, without having any effect on the value of the binary digit weighted two. This provides a tolerance range equal to the extent of $F$ and $G$, i.e. two decimal number positions, for the beginning of the areas of the $A$ and $E$ code tracks in FIG. 5.

Similarly in the odd decimal decades (e.g, 10–19, 30–39, etc.) the binary weighted two occurs when $G=1$. These positions where $G=1$ are bracketed by $E$ changing from 1 to 0 at the low end and $A$ changing from 1 to 0 at the high end. It can be seen that $E$ could change from 1 to 0 anywhere during the decimal number positions 10 and 11, and $A$ could change from 1 to 0 anywhere during the decimal number positions 18 and 19, without having any effect on the value of the binary weighted two. This provides a tolerance range equal to the extent of $F$ and $G$, i.e. two decimal number positions, for the ending of the areas of the $A$ and $E$ code tracks in FIG. 5.

Thus, it can be seen that the start and end of both A and E have a permissible variation of one decimal number position in either direction with respect to the change of state of G without affecting the accuracy of readout insofar as the binary digit weighted two is concerned.

By similar consideration of the equations for the binary digits weighted four, eight and 10 respectively, it will be seen that G determines the start and the end of each of these weighted binary digits and A through E simply bracket the proper section of the G value used. Thus, the change of binary state of each of A, B, C, D and E has a permissible variation of up to, but not including, one decimal number position in either direction with respect to the change of binary state of G without affecting readout accuracy.

The permissible variation of A through E enables manufacturing tolerances which simplify the problem of positioning the mask slits and the photocells for reading zone 1 of the FIG. 3 code disc. An error of up to one numbered position in either direction along the circumferential reference scale, either in the position of a mask slit, or in the position or time of operation of a photocell, will not produce a reading error.

From the foregoing it will be understood that the F and G tracks in the FIG. 5 code are the most critical, and for this reason I provide these tracks by precisely reading the most finely and precisely divided zone on the FIG. 3 code disc, which is zone 3, where the code disc changes binary states every two numbers of the 2,000 total on the reference scale.

Referring to FIG. 4, the mask presents a series of three slits designated F+. These three slits each have a circumferential width of one number of the reference scale, and they are spaced apart by four numbers of the reference scale, so that in any given rotational position of the code disc the three F+ slits will all be reading alike as regards binary zero or binary one areas of zone 3 on the code disc. That is, these F+ slits are "in phase" in all rotational positions of the code disc. Light passing through transparent areas of zone 3 of the code disc and through the three F+ slits strikes a single photocell behind the mask, which then provides a binary one output signal. With this multiple-slit reading arrangement, the photocell receives three times as much light as it would if it were energized through only a single slit of the mask. This produces strong and precisely defined photocell signals on the finest resolution pattern of the code disc.

The mask also presents three slits designated G+ in FIG. 4 for reading zone 3 of the code disc. These three G+ slits are each one reference scale number wide and they are spaced apart from one another in the same manner as the F+ slits, so that in any given rotational position of the code disc the three G+ slits will all be reading alike. A single G+ photocell is positioned behind the three G+ slits, for the reasons stated above.

The G+ slits are displaced circumferentially from the F+ slits by one less than a multiple of four numbers of the reference scale for the code disc. Since the alternate binary zero and binary one areas of zone 3 on the code disc are each two reference numbers long circumferentially, for every four reference numbers through which the code disc is rotated both the F+ and G+ slits will go through a complete cycle of a binary one and a binary zero, with the F signal following the G signal by 90° of this cycle (or one number on the reference scale).

As shown in FIG. 4, at the zero rotational position of the code disc, the F+ slits are reading binary zero and the G+ slits are reading binary one. When the code disc is turned one position clockwise from its zero position (that is, 1/2,000 turn), the F+ slits will now be reading binary one and the G+ slits will continue to read binary one. Continued movement of the code disc to position 2 of its reference scale will cause the F+ slits to continue to read binary one, while the G+ slits now read binary zero. At position 3 the F+ slits read zero and the G+ slits read zero.

From a comparison of FIGS. 4 and 5, it will be apparent that the rotation of the code disc clockwise in FIG. 4 with respect to the nonrotatable slitted mask and photocells will cause the F+ and G+ photocells to produce this sequence of combinations of precisely defined binary one and binary zero output signals which will repeat each cycle of four numbers of the reference scale in accordance with the F and G tracks in the FIG. 5 code. Since 10 numbers representing a decimal decade does not represent an integral number of cycles, the code repeats every 20 numbers.

Still considering positive (clockwise) rotation of the code disc, the A, B, C, D and E tracks in the FIG. 5 code are produced by the output signals from individual photocells positioned behind respective individual slits of the mask which are designated A+, B+, C+, D+ and E+ in FIG. 4. These slits are positioned in confronting relationship to zone 1 of the code disc. The centers of these slits are evenly spaced circumferentially in succession by 22 numbers of the reference scale for the code disc. Each of the A+ through E+ slits has a circumferential width of one number along the reference scale. Since the successive binary one and binary zero areas of zone 1 on the code disc are each 10 numbered positions wide circumferentially, the slits A through E are effectively positioned two numbered positions apart, as far as reading this zone is concerned. It would be impractical to attempt to physically position five separate photocells only two numbered positions apart along the code disc scale, but the present arrangement, in which they are physically spaced by 22 numbered positions, produces exactly the same sequence of binary output signals when the code disc rotates clockwise.

As shown in FIG. 4, in the zero rotational position of the code disc the E+ slit of the mask is opposite the area of zone 1 at the position between 44 and 45, the D+ slit is the code disc position between 22 and 23, the C+ slit is at the code disc position between 0 and 1, the B+ slit is at the code disc position between 1978 and 1979, and the A+ slit is at the code disc position between 1956 and 1957. The A+ through E+ slits now all read binary zero from the code disc. The F+ slits of the mask are opposite the areas of zone 3 of the code disc between 17 and 18, between 21 and 22, and between 25 and 26, respectively, so that these F+ slits all read binary zero from the code disc. The G+ slits of the mask are opposite the areas of the code disc between 1954 and 1955, between 1958 and 1959, and between 1962 and 1963, respectively, so that these G+ slits all read binary one from the code disc. This rotational position of the code disc, therefore, corresponds to the 0 decimal number position in the FIG. 5 code, where the single + slit of the mask is shown reading $A=0$, $B=0$, $C=0$, $D=0$, $E=0$, $F=0$, and $G=1$.

If now the code disc is rotated 1/2,000th of a turn clockwise in FIG. 4, to its 1 position, the E+ slit of the mask will be at the code disc position between 45 and 46, the D+ slit will be between 23 and 24, the C+ slit will be between 1 and 2, the B+ slit will be between 1979 and 1980, and the A+ slit will be between 1957 and 1958. The E+ slit now reads binary one, and the D+, C+, B+ and A+ slits continue to read binary zero. The F+ slits are at the code disc positions from 18 to 19, from 22 to 23, and from 26 to 27, so that these F+ slits all read binary one now. The G+ slits are at the code disc positions from 1955 to 1956, from 1959 to 1960, and from 1963 to 1964, so that these G+ slits all continue to read binary one. This rotational position of the code disc corresponds to position "1" of the + slit in the FIG. 5 code.

From a study of the code disc and the fixed positions of the A+ through G+ reading slits in FIG. 4, it will be apparent that each succeeding rotational position of the code disc will satisfy a corresponding decimally numbered position of the FIG. 5 code, with the cycle repeating when the 20 rotational position is reached.

As shown in FIG. 4, the mask presents a series of three slits designated F− and a series of three slits designated G−, which read zone 3 of the code disc 180° out of phase with the F+ and G+ slits, respectively.

The three F− slits are each one number wide (circumferentially) along the reference scale and they are spaced apart from each other by four numbers of reference scale, so that they all read alike. The F− slits are spaced from the F+ slits by an even number of the reference scale which is not divisible by four. For example, in FIG. 4, each F− slit is displaced 22 numbers circumferentially from the corresponding F+ slit. Since four numbers of the reference scale represent a full 360° on-off cycle of the F+ slits, it will be apparent that when the F+ slits are reading binary one areas of zone 3 on the code disc, the F− slits are reading binary zero areas, and vice versa.

The same relationship is true for the G− slits with respect to the G+ slits.

With the F− and G− slits 180° out of phase with the F+ and G+ slits, these − and + slits are read alternately in push-pull fashion for improved switching operation in the decoding circuitry for the finest decade readout, which is particularly desirable where the input shaft 24 (FIG. 1) will be rotating at relatively high speed.

The same push-pull reading technique may, if desired, be used in reading the A through E binary digits of the FIG. 3 code. To this end, the mask has five slits A−, B−, C−, D− and E− (FIG. 4) and respective individual photocells for reading zone 2 of the code disc. These A− through E− slits are offset circumferentially from the respective A+ through E+ slits by 10 numbers along the reference scale, so that their readings will be 180° out of phase with the respective readings of the A+ through E+ photocells (zones 2 and 1 being identical).

However, in practice these A− through E− readings may be omitted as unnecessary to provide sufficiently accurate readings of the A through E digits of the FIG. 5 code.

The reading of the F+ and G+ digits from zone 3 of the first code disc may be used to provide direction-sensing digitizing. For example, where the code disc is rotating clockwise, the G+ digit will change its binary state from 0 to 190° (or 1 decimal number) ahead of the corresponding change of state of the F+ digit, and this indicates that the input shaft is rotating clockwise. The converse is true if the input shaft is rotating counterclockwise.

The aforementioned A through G photocells produce binary output signals which are applied to a decoder or logic circuitry illustrated schematically in FIG. 15 and containing conventional logic elements arranged in accordance with the Boolean equations of FIG. 6 to provide output signals representing the binary digits weighted one, two, four, eight and 10, respectively. Thus, the code tracks designated F and G in FIG. 5, defined in conjunction with zone 3 of the code disc 22, cooperate with readers or signal generators through associated mask slits to provide precisely defined signals. These precisely defined signals indicate magnitude of the binary digit 2° in accordance with the Boolean equation of FIG. 6. The code tracks A–E in FIG. 5, defined in conjunction with zone 1 of the code disc 22, cooperate with readers or signal generators through associated mask slits to provide imprecisely defined signals, i.e. signals whose beginnings and endings can vary within a tolerance range without adversely effecting the accuracy of the code converter. These imprecisely defined signals depend logically upon the precisely defined signals in accordance with the Boolean equations of FIG. 6, to define 20 unique magnitudes of a multidigit binary number on each cycle of the code illustrated by the code tracks of FIG. 5 and the Boolean equations of FIG. 6. The multidigit binary number itself defines the magnitude of one digit of a number to the base 10 and the magnitude of the binary digit 2° of a second multidigit binary number which indicates the magnitude of the next significant digit of the multidigit number to base 10.

SECOND DECADE READOUT

Throughout the 0 through 9 decimal number positions, (i.e., for every even-numbered decade), of the FIG. 5 code, the decoder circuitry associated with the photocells for zones 1–3 produce a binary zero signal for the binary digit weighted one in the next decade, whose code is shown in FIG. 7. Throughout the 10 through 19 decimal number positions, (i.e., for every odd-numbered decade), of the FIG. 5 code the decoder circuitry associated with the photocells for zones 1–3 provides a binary one signal for the binary digit weighted one in the next decade (see the logic circuitry of FIG. 15 corresponding to the Boolean equation for the binary coded digit of magnitude 10×2°). This binary one signal for the second decade is the binary digit weighted 10 in the first decade, and is designated by line I in FIG. 5 and in FIG. 7. Thus, in FIG. 7 the binary digit weighted 1 has a value of zero during each even-numbered decade of the reference scale (e.g., from 0–9, 20–29, etc., and it has a value of one in each odd-numbered decade (e.g., from 10–19, 30–39, etc.) of the reference scale.

The FIG. 7 code is the conventional 1, 2, 4, 8 binary-coded decimal code, with a 10 added which is actually the digit weighted 1 for the next coarser decade. The five vertical tracks of FIG. 7 represent (from right to left) the binary digits weighted 1, 2, 4, 8 and 10, respectively. As already stated, the binary digit weighted 1 in the FIG. 7 code is received from the readout of the finest decade. The binary digit weighted 2 in FIG. 7 is determined by reading zone 4 of the code disc, the binary digit weighted 4 is determined by reading zone 5, the binary digit weighted 8 is determined by reading zone 6, and the binary digit weighted 10 is determined by reading zone 7 or zone 8.

As shown in FIG. 4, the mask is provided with a lead slit 20–*d* and a lag slit 20–*g* for reading zone 4 of the code disc, there being a separate photocell behind each of these slits. Each slit 20–*d* and 20–*g* has a circumferential width of two numbers of the reference scale. When the unit binary digit (i.e., the binary digit weighted one) in the FIG. 7 code has a binary zero value (which occurs each even-numbered decade of the reference scale, as described) the photocell behind the lead slit 20–*d* is used to read zone 4 of the code disc. When the binary digit weighted one in the FIG. 7 code has a value of one (which occurs in each odd-numbered decade of the reference scale) the photocell behind the lag slit 20–*g* is used to read zone 4 of the code disc. The lead and lag controls (FIG. 15) include conventional circuitry to switch between the leading and lagging photocells in accordance with changes in the binary digit weighted one in the FIG. 7 code as determined by the FIG. 5 code.

Similarly zone 5 of the code disc is read by the photocell behind a lead slit 40–*d* or by the photocell behind a lag slit 40–*g* to provide the binary digit weighted 4 in the FIG. 7 code for the second finest decade.

Zone 6 of the code disc is read by the photocell behind a lead slit 80–*d* or by the photocell behind a lag slit 80–*g* to provide the binary digit weighted 8 in the FIG. 7 code for the second finest decade.

Zone 7 of the code disc is read by the photocell behind a lag slit 100–*g*, or zone 8 of the code disc is read by the photocell behind a lead slit 100–*d*, to provide the binary digit weighted 10 in the FIG. 7 code for the second finest decade. The purpose of using the two zones 7 and 8 to provide the binary digit weighted 10 in the FIG. 7 code is to conserve the circumferential distance required. This permits use of a smaller lens and mask.

In all of zones 5–8, the selection of a lead or lag slit reading is made automatically in response to the binary state of the binary digit weighted 1 in the FIG. 7 scale, the same as for zone 4. The reading slits for zones 5–8 all have a circumferential width of two numbers of the reference scale, which is only 2/10 of the length of a single-decimal number of the FIG. 7 scale because each decimal number there represents 10 numbers of the reference scale.

From FIG. 7 it will be apparent that the reading of the binary digit weighted 2 (which is read from zone 4 of the code disc) should be zero for the first two decades (0–9 and 10–19) of the FIG. 5 code, and it should be one for the next two decades (20–29 and 30–39) of the FIG. 5 code. Theoretically, this reading of the binary digit weighted 2 could be accomplished by providing a single slit and photocell for reading zone 4 of the code disc. However, at any changeover point between a binary zero and a binary one reading on this zone, if the photocell were energized too early or too late this would produce a readout error of 10 numbers of the reference scale. To avoid this possibility and at the same time to greatly increase the permissible manufacturing tolerances for the second decade of the code disc, the aforementioned lead and lag reading slits are provided.

As an example, from FIG. 4 it will be apparent that the lead slit 20–*d* for zone 4 of the code disc leads by six numbers of the reference scale. That is, the FIG. 7 code would be satisfied if a theoretical single slit of zero width were at position 1910 of the reference scale in the zero position of the code disc (FIG. 4), so that it would require clockwise rotation of the code disc through 20 numbers of the reference scale before the next binary one area on zone 4 (from 1930 to 1950) would first pass beneath this theoretical slit. In that case the photocell at this theoretical slit would begin to read binary one from zone 4 exactly when the unit binary digit of the FIG. 5 code changes from 1 to 0. However, in the arrangement shown in FIG. 4 this 1930–1950 binary one area of zone 4 will first pass the center of slit 20–*d* after the code disc has rotated clockwise through 14 numbers of the reference scale, and it will remain beneath slit 20–*d* from position 14 to position 34 of the code disc. From the FIG. 7 code it will be evident that the photocell behind the lead slit 20–*d* is used to read zone 4 only during even decades, such as from rotational position 20 to position 29 of the code disc. Therefore, the photocell at lead slit 20–*d* has begun to read binary one from zone 4 of the code disc six positions ahead of the position required to satisfy the code of FIG. 7. In this sense, therefore, the photocell at the lead slit 20–*d* "leads" the theoretical single-slit position for the FIG. 7 code.

The lag slit 20–*g* for zone 4 of the code disc lags the theoretical slit position by four positions along the reference scale. That is, the FIG. 7 code will read the photocell behind slit 20–*g* during the odd decades, such as after the code disc has rotated from 30 numbers clockwise through 39 numbers clockwise. However, as shown, the photocell behind slit 20–*g* will indicate the binary one area of zone 4 after the code disc has rotated through 24 positions and it will stay on until position 44, so that it "lags" by four positions the readings of the theoretical single slit.

The readings of the lead and lag slits 20–*d* and 20–*g* overlap between reference scale positions 24 and 34, so that even if changes in zone 4 are in error in respect to the unit binary digit of the second decade by several positions along the reference scale this will not produce an error in the reading of the binary digit weighted 2 in the second decade readout. The unit binary digit of the second decade is determined by edges of the pattern on zone 3 of the code disc, which determine the G photocell readings according to the FIG. 5 code. Hence, the fine resolution zone, zone 3, determines the accuracy, and zone 4 can be in error by several reference numbers with no adverse effect.

The foregoing is true for each of the remaining lead slits 40–*d*, 80–*d* and 100–*d* and lag slits 40–*g*, 80–*g* and 100–*g* of this second finest decade.

In practice, therefore, the tolerances permissible for the second decade readout are considerably greater than those for the first decade. Positions of changes of binary state on zones 4, 5, 6, 7 and 8 of the code disc may be in error by several reference scale numbers and the code disc will still be read to the accuracy of the finest zone, zone 3, or 1/2000 of a revolution of the code disc.

The photocells behind the lead and lag slits 20–*d*, 20–*g*, 40–*d*, 80–*g*, 80–*g*, 100–*d* and 100–*g* produce binary output signals which are applied to a decoder circuit (not shown) containing logic elements arranged in accordance with the conventional 1–2–4–8 binary-coded decimal code. The switching between lead and lag photocell output signals is preformed in accordance with the binary condition of the unit digit in this second decade. The binary condition of the unit digit in the second decade being determined by the first decade in accordance with Boolean equations of FIG. 6 and the logic circuitry for the binary digit 10×2° (FIG. 15). The logic elements in this decoder produce output signals representing the binary digits weighted 2, 4, 8 and 10, respectively.

COARSE DECADE READOUT ON FIRST CODE DISC

The same principles hold true for reading zones 9 through 12 of the code disc for the coarse decade on this code disc. The tolerances permissible for this decade are 10 times those permissible for the second decade. The reading slits for these zones all have a width of four numbers along the reference scale, so that less sensitive photocells may be used.

FIG. 8 shows the code for the coarse decade on the FIG. 3 code disc. It will be apparent that this is a conventional 1, 2, 4, 8 binary-coded decimal code, with a 10 added which is actually the binary digit weighted 1 for the next decade. The code of FIG. 8 is identical to the code of FIG. 7.

The binary digit having unit weight in the FIG. 8 code is the binary digit having weight 10 in the FIG. 7 code for the middle decade. This digit is read from zones 7 and 8 of the code disc. Consequently, in the rotational positions of the code disc from 0 to 99, the binary digit weighted 1 in the FIG. 8 code has a value of zero; from 100 to 199, the binary digit weighted 1 in the FIG. 8 code has a value of 1; from 200 to 299, zero; and so on. In positions where this digit has a value of zero, as it does for all even-numbered hundreds of the reference scale, the lead photocells behind slits 200–*d*, 400–*d*, 800–*d*, 1000–*d* are used. In positions where this digit has a value of one, as it does for all odd-numbered hundreds of the reference scale, the lag photocells behind slits 200–*g*, 400–*g*, 800–*g*, 1000–*g* are used. This is essentially similar to the reading control of middle decade, as described.

It will be seen from FIG. 8 that the binary digit weighted 2 in this code would be satisfied if zone 9 were to change its reading from 0 to 1 after the code disc has rotated clockwise 200 numbered positions along the reference scale from its zero position of FIG. 4, and to change from 1 to 0 after the code disc has reached position 400. However, the position of the lead slit 200–*d* for reading zone 9 is such that its photocell will be activated after the code disc reaches position 150 and it will remain activated until the code disc reaches position 350. This photocell signal will be used from position 200 to position 299. The position of the lag slit 200–*g* for reading zone 9 is such that its photocell will come on after the code disc reaches position 250 and it will stay on until the code disc reaches 450. This photocell signal will be used from position 300 to 399.

The same is true for the photocells at the lead slit 400–*d* and the lag slit 400–*g* for reading zone 10 of the code disc to provide the binary digit weighted 4 in the FIG. 8 code, for the photocells at the lead and lag slits 800–*d* and 800–*g* for reading zone 11 of the code disc to provide the binary digit weighted 8 in the FIG. 8 code, and for the photocells at the lead and lag slits 1000–*d* and 1000–*g* for reading the innermost zone 12 of the code disc to provide the binary digit weighted 10 in the FIG. 8 code.

The decoder circuit connected to the lead and lag photocells for this third decade is essentially the same as that for the second decade photocells, and this is also true of subsequent coarser decades on the second code disc.

READING THE SECOND CODE DISC

FIG. 9 shows the second code disc 23 arranged to provide increasing numbers for counterclockwise rotation. Here again, for convenience of illustration the second code disc is shown with opaque areas for binary one signals and light areas for binary zero signals. In actual practice, however, these will be reversed so that for a binary one signal the code disc will present a transparent area to the respective photocell, and for a binary zero signal the code disc will present an opaque area to the respective photocell.

The second code disc is basically similar to the first code disc, shown in FIG. 3 and already described in detail, except that it is encoded with binary one and binary zero areas for increasing numbers with counterclockwise rotation. The second code disc has 12 arcuate zones, designated 1′ through 12′ respectively, and these zones are read by photocells behind a slitted opaque mask which is identical to the mask provided for reading the first code disc, as shown in FIG. 4.

Both zones 1′ and 2′, which are the outermost zones on this code disc, provide a binary zero area from the reference scale number 1996 to 6, from 16 to 26, and so on at evenly spaced intervals circumferentially, and binary one areas (e.g., from 6 to 16, 26 to 36, etc.) between the binary zero areas. Thus, both zones 1′ and 2′ provide alternate binary one and binary zero areas in succession circumferentially, each area being 10 numbers wide circumferentially along the reference scale.

Zone 3′ provides alternate binary one and binary zero areas in succession circumferentially, each having a circumferential width of two numbers of the reference scale. For example, binary one areas appear from 0 to 2, 4 to 6, 8 to 10, etc., and binary zero areas appear from 1998 to 0, 2 to 4, 6 to 8, etc.

Zone 4′ presents binary one areas from 10 to 30, 50 to 70, 110 to 130, 150 to 170, and so on in a repetitive sequence, and binary zero areas from 1970 to 10, 30 to 50, 70 to 110, 130 to 150, etc.

Zone 5′ presents binary one areas from 10 to 50, 110 to 150, 210 to 250, etc., and binary zero areas from 1950 to 10, 50 to 110, 150 to 210, etc.

Zone 6′ presents binary one areas from 30 to 50, 130 to 150, 230 to 250, etc., and binary zero areas from 1950 to 30, 50 to 130, 150 to 230, etc.

Zone 7′ presents binary one areas from 70 to 170, 270 to 370, 470 to 570, etc., and binary zero areas from 1970 to 70, 170 to 270, etc.

Zone 8′ presents binary one areas from 1930 to 30, 130 to 230, 330 to 430, etc., and binary zero areas from 30 to 130, 230 to 330, etc.

Zone 9′ presents binary one areas from 220 to 420, 620 to 820, 1220 to 1420, and 1620 to 1820, and binary zero areas from 1820 to 220, 420 to 620, 820 to 1220, and 1420 to 1620.

Zone 10′ presents binary one areas from 390 to 790, and from 1390 to 1790, and binary zero areas from 1790 to 390, and from 790 to 1390.

Zone 11′ presents binary one areas from 1820 to 20, and from 820 to 1020, and binary zero areas from 20 to 820, and from 1020 to 1820.

Zone 12′ presents a binary one area from 1000 to 0, and a binary zero area from 0 to 1000.

Since the slitted mask and photocell arrangement for reading the second code disc (FIG. 9) is identical to that described with reference to FIG. 4, this description will not be repeated in detail.

As already mentioned in the general description, the finest decade code disc (provided by zones 1′–3′ in FIG. 9) is not read. One reason for this is avoid the necessity of a gear reduction of 1000 to 1 between the first and second code discs, permitting instead a 100 to 1 gear reduction whose accommodated without producing a reading error, as explained hereinafter.

Zones 4′–8′ provide the binary digits weighted 2, 4, 8 and 10 for the finer decade which is read on the second code disc, the binary digit weighted 1 in this decade being provided by the reading of zone 12 on the first code disc. Zones 9′–12′ provide the binary digits weighted 2, 4, 8 and 10 for the coarser decade, the binary digit weighted 1 in this decade being provided by reading zones 7′ and 8′. These zones are read by the lead-lag technique already described in detail with reference to zones 4–8 on the first code disc, and this description will be unnecessary to repeat.

Zones 4′–8′ on the second code disc provide all but the unit binary digit for the fourth finest decade of the decimal number readout, and the tolerances permissible for this decade are ten times those permissible for the next finer decade (which is the coarse decade on the first code disc). It will be understood that the tolerances permissible for this fourth finest decade must take care of the backlash in the 100 to 1 reduction gearing between the two discs, as well as position errors (if any) of the binary code areas in zones 4′–8′ and position errors of the corresponding reading slits. However, with the present arrangement the binary digit weighted 1 in this fourth decade is read from zone 12 of the first code disc, so that gear backlash cannot affect the reading of this digit, which determines the accuracy of the reading of this decade, as will be apparent from the FIG. 8 code. The permissible tolerances for reading the remaining binary digits of this decade are so great (due to the provision of the lead and lag reading devices, as described in detail with reference to zones 4–8 of the first code disc) that all of the foregoing error factors can be accommodated without having an error in the fourth decade readout. This is a significant advantage of the present invention since it enables the use of two code discs, with reduction gearing between them, and avoids the problems associated with providing all of the binary-coded areas on a single code disc.

Zones 9′–12′ provide the binary digits weighted 2, 4, 8 and 10 for the next coarser decade of the decimal number readout, and the tolerances permissible for this decade are ten times those permissible for the next finer decade (zones 4′–8′).

COARSEST DECADE READOUT

Referring to FIG. 1, the binary digits weighted 2, 4, 8 and 10 in the coarsest decade are provided by switches operated by the four cams C–2, C–4, C–8 and C–10 on shaft 47. The binary digit weighted 1 in this coarsest decade is the binary digit weighted 10 in the immediately preceding decade, obtained by reading zone 12′ of the second code disc 23.

These cams are keyed to a sleeve 51 on this shaft, and they are positioned axially along the shaft by a spacer 52 located between gear 50 and cam C–2, a spacer 53 between cams C–2 and C–4, an external shoulder 54 on sleeve 51 between cams C–4 and C–8, and a spacer 55 between cams C–8 and C–10. A bolt 56 holds the parts assembled as shown in FIG. 1.

If the second code disc 23 is a counterclockwise-rotating disc for increasing numbers, then the cams C–2, C–4, C–8 and C–10 will be the set of cams shown in FIGS. 10–13. However, if the second code disc rotates clockwise for increasing numbers, then the same cams will be used but they will be mounted with opposite side up.

The code for the final coarsest decade is the same as that of FIG. 8. The binary digit weighted one in this code is the binary digit weighted 10 in the readout from the coarse decade of the second code disc 23. The binary digit weighted 2 in the final, coarsest decade is provided by lead and lag switches operated by cam C–2. The binary digit weighted 40 in the final decade is provided by lead and lag switches operated by cam C–4. The binary digits weighted 8 and 10 in the final decade are provided by lead and lag switches operated by cams C–8 and C–10, respectively.

Figure 10:
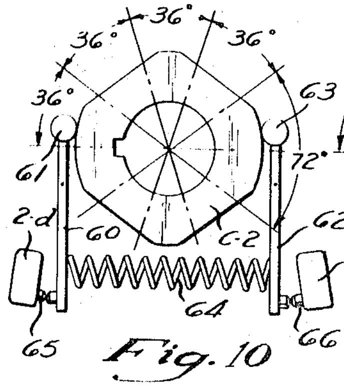
FIG. 10 shows the cam and the lead and lag switches for providing the binary digit weighted two in the binary-coded decimal code for the coarsest decade.
Figures 11, 12, 13:
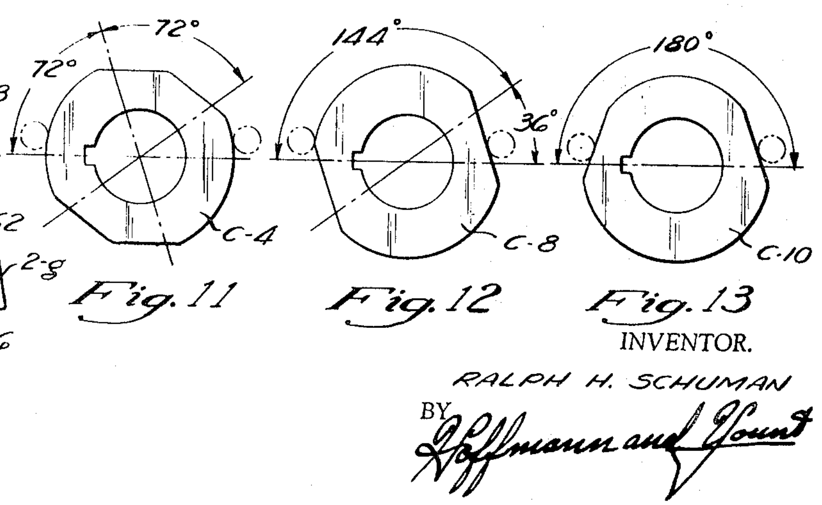
FIG. 11 shows the cam for operating similar switches to provide the binary digit weighted four in the binary-coded decimal code for the coarsest decade.
FIG. 12 shows the cam for operating such switches to provide the binary digit weighted eight in the binary-coded decimal code for the coarsest decade.
FIG. 13 shows the cam for operating such switches to provide the binary digit weighted 10 in the binary-coded decimal code for the coarsest decade.

Referring to FIG. 10, it will be apparent that the cam C–2 has a series of high and low surfaces on its periphery. A "lead" switch 2–*d* and a "lag" switch 2–*g* are positioned on opposite sides of cam C–2. The lead switch 2–*d* is positioned to be operated by a pivoted lever 60 which carries a cam follower 61 engaging the left side of cam C–2 9° above its horizontal centerline. A similar pivoted lever 62 for operating the lag switch 2–*g* carries a cam follower 63 engaging the right side of cam C–2 9° above its horizontal centerline. A coil spring 64 is engaged under compression between these levers below the cam to bias their lower ends outwardly so as to depress the plungers 65, 66 of the respective switches, as well as to maintain the respective followers 61 and 63 engaging the periphery of cam C–2.

The lead switch 2–*d* provides a binary one signal when its plunger 65 is depressed, and a binary zero signal when its plunger is not depressed. The lag switch 2–*g* provides a binary one signal when its plunger 66 is depressed, and a binary zero signal when its plunger is not depressed.

Cam C–2 has four arcuate high segments and four flat low segments interconnecting the high segments. When the cam follower 61 for the lead switch 2–*d* engages a high segment of cam C–2, this switch will provide a binary zero signal; when it engages a low segment of cam C–2, lead switch 2–*d* will provide a binary one signal. Similarly, the lag switch 2–*g* provides a binary one signal when its cam follower 63 engages a low segment of cam C–2, and a binary zero signal when its cam follower engages a high segment of cam C–2.

Considering the operation of cam C–2 switches 2–*d* and 2–*g* with reference to the code of FIG. 8, FIG. 10 shows cam C–2 in its zero rotational position, with both switches 2–*d* and 2–*g* being in the binary zero condition. Since the complete cycle of the FIG. 8 code requires 20 decimal number positions, it will be apparent that each successive decimal number in this code represents 18° of rotation of cam C–2.

Rotation of cam C–2 18° counterclockwise from the zero rotational position of FIG. 10 will not change the binary condition of either switch 2–*d* or 2–*g*. This satisfies the FIG. 8 code.

However, continued rotation of cam C–2 counterclockwise will cause the lead switch cam follower 61 to engage the next low surface on the cam 9° ahead of the 36° position, so that lead switch 2–*d* will be in the binary one condition by the time that cam C–2 reaches the 36° (or decimal number two) position (FIG. 16), and switch 2–*d* will remain in this binary one condition until cam C–2 has moved 9° past the 54° (or decimal number 3) position of FIG. 17. The cam follower 63 for the lag switch 2–*g* will engage the next low surface on cam C–2 9° after the 36° (decimal number 2) position (FIG. 16) of the cam, so that the lag switch will now be in its binary one condition and it will remain in this condition until after the cam has rotated 9° past its 72° (decimal number 4) (FIG. 18) position.

The decoder circuit associated with lead and lag switches 2–*d* and 2–*g* includes logic elements which are used alternatively in accordance with the binary state of the binary digit weighted 1 for this decade (which is the binary digit weighted 10 in the coarse decade on the second code disc 23). The lead switch 2–*d* is connected to operate this decoder circuit when this unit digit is zero, and the lag switch 2–*g* is connected to operate this circuit when this unit digit is one. Therefore, it will be seen that the lead switch 2–*d* reads the decimal number 2 position of cam C–2, and lag switch 2–*g* reads the decimal number three position of the cam. Lead switch 2–*d* is operated to its binary one condition by cam C–2 9° ahead of when it is required to do so in order to satisfy the FIG. 8 code, and lag switch 2–*g* is maintained in its binary one condition for 9° after it is required to do so to satisfy the FIG. 8 code. Also, there is an overlap of 9° in the binary one conditions of these switches. Therefore, it will be seen that these switches provide a lead-lag reading operation essentially similar to that provided by the lead-lag slits and photocells for reading the code discs, as already described.

It will be evident that the profile of cam C–2 is such that the lead and lag switches 2–*d* and 2–*g* will be operated to satisfy the code of FIG. 8 throughout each 360° cycle of rotation of the cam.

This is also true of cam C–4 (FIG. 11) which provides the binary digit weighted 4 in accordance with the FIG. 8 code, of cam C–8 (FIG. 12) which provides the binary digit weighted 8, and of cam C–10 (FIG. 13) which provides the binary digit weighted 10. Each of these cams operates a pair of cam followers and lead and lag switches positioned identical to those shown in FIG. 10. The profile of each cam determines the operation of its respective pair of switches in accordance with the correspondingly numbered columns of the FIG. 8 code. Each pair of lead and lag switches provides the lead-lag reading operation already described in detail.

An encoder embodying certain of the novel principles of the present invention, but having a second, coarser code disc and reading arrangement different from that described and omitting the cam-operated switches, may be used to provide a direct readout of the rotational angle of a member, such as a rotary indexing table in a machine tool. For example, the indexing table may be provided with a worm gear having 180 teeth and the worm shaft may be connected directly to the input shaft 24 in the FIG. 1 apparatus. The first, finer code disc 22 and its reading arrangement will be identical to that described in detail hereinbefore. Each rotation of the worm shaft will produce 1/180th rotation of the worm gear, or 2° of rotation of the indexing table. Zones 1–3 of the first code disc 22 will provide the finest decade readout (which is the 0.001° decade), in accordance with the FIG. 5 code, as well as the binary digit weighted one in the next coarser decade. Zones 4–8 of the first code disc 22 will provide the balance of this next coarser decade readout (which is the 0.01° decade), in accordance with the FIG. 7 code, as well as the binary digit weighted one in the next coarser decade. Zones 9–12 of the first code disc will provide the balance of the next coarser decade readout (which is the 0.1° decade), in accordance with the FIG. 8 code, as well as the binary digit weighted one for the next coarser decade.

In this embodiment of the present invention the gear reduction between the first code disc and the second code disc is 180 to 1. The second code disc has just two groups of binary-coded circumferentially extending zones in succession radially inward, and for each zone there is provided a lead and lag reading device operating in accordance with the principle of operation already explained in detail.

The first, outwardly positioned, finer group of binary-coded zones on the second disc and the corresponding reading devices are arranged to provide a reading in accordance with the code of FIG. 8.

The outer four zones will provide the balance of the next coarser decade readout (which is the 1.0° decade) in accordance with the FIG. 8 code as well as the binary digit weighted one in the next coarser decade.

The binary digit weighted 1 in the FIG. 8 code is obtained by reading zone 12 of the first code disc 22. As already explained, it is this unit binary digit which determines the accuracy of reading this decade, and this unit binary digit reading is not affected by gear backlash between the code discs because it is read from the first, higher speed code disc. The binary digits weighted 2, 4, 8 and 10 in this FIG. 8 code are obtained by reading corresponding zones of the first group on the second code disc by the lead-lag technique already explained, which provides sufficient margin for error to accommodate the gear backlash, as well as any positional errors of the binary-coded zones or reading devices.

Figure 14:
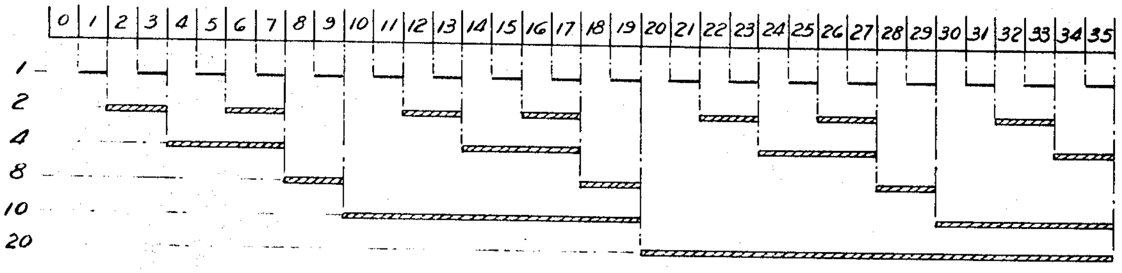
FIG. 14 shows the binary-coded decimal code for each of the two groups of zones on the coarser, second code disc in an alternative embodiment of the present invention which is intended to provide an angular readout.

The second, inwardly positioned, coarser group of binary-coded zones on the second code disc and the corresponding lead-lag reading devices provide a reading in accordance with the FIG. 14 code. These zones provide the balance of the next coarser decade readout (which is the 10° decade) in accordance with the FIG. 14 code, as well as the binary digit weighted one and two in the next coarser decade (which is part of a 100° decade).

It will be apparent that the FIG. 14 code is essentially an extension of the FIG. 8 code, being identical to the latter through decimal numbers 0–19. In addition to the columns for the binary digits weighted 1, 2, 4, 8 and 10, the FIG. 14 has a column for the binary digit weighted 20, this digit being zero from decimal number 0 through decimal number 19, and being one from decimal number 20 through decimal number 35. In FIG. 14, the binary digits weighted 1, 2, 4, 8 and 10 begin to recycle at the decimal number 20 and continuing through decimal number 35. The binary digit weighted one in this coarsest reading will be provided by the binary digit weighted 10 in the next preceding, finer decade. The binary digits weighted 2, 4, 8, 10 and 20 in this coarsest reading are obtained by reading respective zones inwardly positioned on the second code disc.

With this arrangement, therefore, the finer, outwardly positioned zones on the second code disc read the increments of angular position of the indexing table from 0° to 20° and repeat on a 20° cycle. The coarser, inwardly positioned zones on the second code disc read from 20° to 360° with no repetition.

From the foregoing description and the accompanying drawings, it will be apparent that the particular analog-to-digital converters disclosed therein are particularly well-suited to accomplish objectives of the present invention in a novel and advantageous manner. However, while certain presently preferred embodiments of the present converter have been described in detail and illustrated in the accompanying drawings, it is to be understood that various modifications, omissions and refinements which differ from the disclosed embodiments may be adopted without departing from the spirit and scope of the present invention, as defined in the appended claims.

I claim:

1. An analog-to-digital converter comprising:
- a first rotatable binary-coded code disc providing a plurality of readout decades encoded to provide increasing decimal numbers for rotation in one direction;
- a second rotatable binary-coded code disc providing additional coarser readout decades encoded to provide increasing decimal numbers for rotation in the opposite direction;
- speed-reducing means acting between said discs for rotating said second code disc at a decimal fraction of the rotational speed of said first code disc and in the opposite rotational direction;
- first multiple reading means for reading said first code disc;
- second multiple reading means for reading said second code disc;
- said second reading means being identical to said first reading means, and said first and second code discs being interchangeable for opposite rotational directions of a rotary input member;
- a plurality of rotatable cams;
- speed-reducing means acting between said second code disc and said cams for rotating said cams at a decimal fraction of the rotational speed of said second disc;

and a plurality of switches positioned to be operated by said cams in accordance with a binary-coded decimal code to provide binary digits of the coarsest readout decade.

2. A code converter comprising a coded information member and a plurality of signal generators which cooperate to provide a plurality of signals defining a cyclic code for use in numerically indicating the magnitude of a quantity with a multidigit number to base 10, said member having a first code zone and two-phase displaced signal generators cooperating therewith to provide first and second precisely defined signals which define the value of the 2° order digit of a multidigit binary number indicating the value of a given order digit of said multidigit number to base 10, a second code zone on said member and five-phase displaced signal generators cooperating therewith to provide five signals which have a larger tolerance range than said precisely defined signals and which in logical dependence on said first and second precisely defined signals define different values of said multidigit binary number on each cycle of the code with each of the different magnitudes of the multidigit binary number representing a subdivision of the quantity with each subdivision having an extent equal to that corresponding to the unit value of said given order digit of said multidigit number to base 10, and means for deriving from said plurality of signals the value of the 2° order digit of a multidigit binary number indicating the value of the next significant order digit of said multidigit number to base 10.

3. A code converter as set forth in claim 2 wherein said plurality of signal generators further comprise lead-reading devices which cooperate with said coded information member and read a third code zone in advance of a reference position, lag-reading devices which cooperate with said coded information member and read said third code zone rearwardly of said reference position, and means for switching between said lead and lag reading devices in response to changes in the 2° order digit of said multidigit binary number indicating the value of the next significant order digit of said multidigit number to base 10.

4. A code converter comprising a coded information member and signal generators for indicating the magnitude of a quantity with a multidigit number to base N where N is greater than 2, said member having code track means for activating a plurality of said signal generators to provide signals of the binary type, means for logically combining said signals to define the value of a given order digit of said number, said signals defining a cyclic code having at least 2N unique representations for at least 2N subdivisions of the quantity where the extent of each subdivision corresponds to the unit value of said given order, and means for deriving from said signals the value of the 2° order digit of a multidigit binary number indicating the value of the next significant order digit of said multidigit number to base N in logical dependence on signals for logically defining the value of the given order digit of said multidigit number to base N, said code track means and signal generator means comprising first means for providing a first series of precisely defined signals having at least N representations during each cycle of said cyclic code and second means for providing a second series of precisely defined signals having at least N representations during each cycle of said cyclic code, said first means for providing said first series of precisely defined signals being out of phase with said second means for providing said second series of precisely defined signals by an extent which is at least equal to the extent represented by one of said subdivisions, said first and second series of precisely defined signals being related to each other in such a manner as to define a digit of a multidigit coded number representative of the magnitude of said given digit of said multidigit number to base N.

5. A code converter as set forth in claim 4 wherein said code track means and signal generator means further comprises third means for providing a third series of signals which define other digits of said multidigit coded number, said third series of signals depending logically upon said first and second series of precisely defined signals to precisely define the value of said multidigit coded number to thereby precisely define said given order digit of said multidigit number to the base N and the magnitude of said 2° order digit of the multidigit binary number indicating the magnitude of the next significant order digit of said multidigit number to base N.

6. A code converter as set forth in claim 5 wherein said third series of signals have beginning and ending tolerance ranges having an extent corresponding to substantially two subdivisions of the quantity.

7. A code converter as set forth in claim 4 wherein the multidigit coded number is to base X and wherein X is less than N.

8. A code converter comprising a coded information member and signal generators for indicating the magnitude of a quantity with a multidigit number to base N where N is greater than 2, said member having code track means for activating a plurality of said signal generators to provide signals of the binary type, means for logically combining said signals to define the value of a given order digit of said number, said signals defining a cyclic code having at least 2N unique representations for at least 2N subdivisions of the quantity where the extent of each subdivision corresponds to the unit value of said given order, and means for deriving from said signals the value of the 2° order digit of a multidigit binary number indicating the value of the next significant order digit of said multidigit number to base N in logical dependence on signals for logically defining the value of the given order digit of said multidigit number to base N, said code track means and said signal generator means comprising means for producing a first plurality of precisely defined signals and a second plurality of signals having a larger tolerance range than said precisely defined signals during each cycle of said cyclic code, said second signals being logically dependent upon said first signals in such a manner as to define a multidigit code number indicating the value of said given order digit of said multidigit number to the base n N for each of said 2N subdivisions of the quantity.

9. A code converter as set forth in claim 8 wherein said code track means and said signal generator means further comprises means for changing each of said second signals from the binary value $\overline{1}$ to the binary value 1 and from the binary value 1 to the binary value $\overline{1}$ once and only once during each cycle of said cyclic code.

10. A code converter as set forth in claim 8 wherein said first signals have an extent corresponding to X subdivisions of said 2N subdivisions and each of said second signals has an extent corresponding to at least N minus X subdivisions.

11. A code converter comprising a coded information member and signal generators for indicating the magnitude of a quantity with a multidigit number to base N where N is greater than 2, said member having code track means for activating a plurality of said signal generators to provide signals of the binary type, means for logically combining said signals to define the value of a given order digit of said number, said signals defining a cyclic code having at least 2N unique representations for at least 2N subdivisions of the quantity where the extent of each subdivision corresponds to the unit value of said given order, and means for deriving from said signals the value of the 2° order digit of a multidigit binary number indicating the value of the next significant order digit of said multidigit number to base N in logical dependence on signals for logically defining the value of the given order digit of said multidigit number to base N, said signal generators further comprising leading and lagging reading devices for cooperating with said coded information member to provide signals indicating the value of other digits of the multidigit binary number and means for controlling the operation of said leading and lagging reading devices in response to changes in the magnitude of said 2° order digit of the multidigit binary number.

12. A code converter comprising a coded information member and signal generators for indicating the magnitude of a quantity with a multidigit number to base N, said member having coded track means for activating a plurality of signal generators to provide signals, means for logically combining said signals to define the value of a given order digit of said number with a multidigit coded number, said coded track means and signal generators providing a cyclic code representing the digits of said multidigit coded number by forming first and second precisely defined signals indicating the value of a digit of said multidigit coded number, said coded track means and signal generators providing third signals having a larger tolerance range than said precisely defined signals, and means for logically combining said third signals and said first and second precisely defined signals to precisely define other digits of said multidigit coded number to thereby precisely define the digit value of the given order digit of the multidigit number to base N whereby said third signals logically depend upon said first and second signals in such manner that a variation in the beginning and ending of sad third signals within the predetermined tolerance ranges is ineffective to vary the value of said multidigit coded number and the value of the given order digit of said multidigit number to base N, each of said third signals changing condition between binary 1 and $\overline{1}$ only twice in each cycle of said cyclic code with each of said changes in condition occuring in a tolerance range of an extent substantially equal to the extent of one of said precisely defined signals.

13. A code converter as set forth in claim 12 wherein said third signals include five signals having a relatively large beginning and ending tolerance range and only four of which are required to define the other digits of said multidigit coded number in logical dependence on said first and second precisely defined signals to indicate any one value of the given order digit of the multidigit number to base N.

14. A code generator as set forth in claim 12 wherein said means for logically combining said signals includes means for combining said first and second precisely defined signals to define the value of a digit of said multidigit coded number.

15. A code converter comprising a coded information member and signal generators for indicating the value of a quantity with a multidigit number to base N, said member having first code track means for activating a first plurality of said signal generators to provide first signals, means for logically combining said first signals to define the value of a given order digit of said multidigit number to base N with a first coded multidigit number, second code track means for activating a second plurality of said signal generators to provide second signals, means for logically combining said second signals to at least partially define the digit b value of the next significant order digit of said multidigit number to the base N with a second coded multidigit number, said second plurality of signal generators including lead and lag reading devices which are used alternately, said first signals defining a cyclic code having unique representations for subdivisions of the quantity where each subdivision has an extent equal to the unit value for the digit of said given order, means for deriving from said first signals a third signal for at least partially defining a digit of said second coded multidigit member, said second signals defining a cyclic code which cooperates with said third signal derived from said first signals to provide unique representations for subdivisions of the quantity where each subdivision has an extent equal to the unit value for the digit of said next significant order, and means for switching between said lead and lag reading devices in response to said third signal.

16. A code converter as set forth in claim 15 wherein the cyclic code defined by said first signals provided by said first code track means and said first plurality of signal generators has 2N unique representations for 2N subdivisions of the quantity.

17. A code converter as set forth in claim 16 wherein the cyclic code defined by said second signals cooperates with said third signal derived from said first signals and has 2N unique representations for 2N subdivisions of the quantity.

* * * * *